United States Patent Office 3,510,339
Patented May 5, 1970

3,510,339
EPOXY COATED SUBSTRATE AND METHOD
OF MAKING THE SAME
Raymond Glen Wile, Dallas, Tex.
(1920 Sunnybrook, Irving, Tex. 75060)
No Drawing. Filed Oct. 22, 1968, Ser. No. 778,369
Int. Cl. B44d 1/14; B32b 27/14, 27/38
U.S. Cl. 117—26                      10 Claims

ABSTRACT OF THE DISCLOSURE

A coating system for floors, walls, and the like comprising a first layer of an epoxy resin and a curing agent, an aggregate deposited on said first layer and a second layer deposited over said aggregate and said first layer, said second layer comprised of a polyglycidyl ether of a polyhydric phenol and a curing agent chosen from the group of polyoxypropylenediamines and triamines.

BACKGROUND OF THE INVENTION

The present invention relates to coating compositions and to cured products produced therefrom. More particularly, the present invention relates to curable compositions for use as a coating system on floors, walls and other such surfaces.

Prior art polyepoxide based compositions used as thin films (250 mils or less) in floor and wall coating applications have suffered from several severe limitations. One problem has been what is commonly referred to in the art as "amine blush." This so called "amine blush" is caused by exudation of unreacted polyepoxide to the surface of the cured film resulting in a surface which is tacky or possesses a greasy appearance. Furthermore, the prior art coatings have suffered from other disadvantages such as poor color (Gardner 2), inadequate impact strength, and poor flexibility resulting in reduced wearing ability.

SUMMARY

It is therefore an object of the present invention to provide a polyepoxide based coating system for use on floors, walls, and the like which can be used to obtain finished coatings having an aesthetically pleasing appearance, high impact strength, and good flexibility.

It is further an object of the present invention to provide a polyepoxide based coating composition having a thin film finishing layer which is free from "amine blush" and has excellent wearability.

Still a further object of the present invention is to provide a method for coating a surface such as a floor, wall or the like.

These and numerous other objects of the present invention, many of which will be apparent from the description given herein and from a reading of the appended claims, can be obtained by utilization of a coating system for floors and walls comprising a first epoxy resin layer, said first epoxy resin layer being an adhesive barrier coat, which comprises a polyepoxide resin having an epoxy equivalency of more than one and an amine curing agent, An aggregate deposited onto said first epoxy resin layer, A second epoxy resin layer, said second epoxy resin layer being a finishing overcoat comprising a polyglycidyl ether of a polyhydric phenol having an epoxide equivalent weight of greater than 150 and a liquid polyoxypropylene- amine chosen from the group consisting of diamines having the general formula:

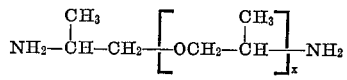

wherein $x$ is from about 2 to 34 and triamines having the general formula:

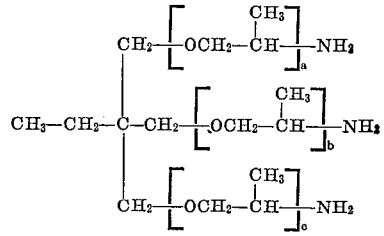

wherein $a+b+c=5.3$.

DESCRIPTION OF THE PREFERRED
EMBODIMENTS

In practicing the present invention, the first epoxy resin layer of the coating system disclosed herein is deposited on the surface of the floor, wall or the like. The substrate, which may be a wall, or other surface, can be of any of the common materials used for these purposes such as concrete, stucco, wood, metal, plastic composition, and the like.

This layer, referred to herein as the adhesive barrier coat, can be of any of the well known epoxy resins having an epoxy equivalency of more than one. As is well known in the art, these resins may be prepared by condensing epichlorohydrin with a polyhydric alcohol or phenol, for example, ethylene glycol, diethylene glycol, glycerol, diglycerol, catechol, resorcinol, a trihydroxybenzene, a di(hydroxyphenyl) methane, a di(hydroxyphenyl) ethane, a di(hydroxyphenyl) propane, etc. A preferred type of polyepoxide used in the first epoxy resin layer, i.e., the adhesive barrier coat is that derived from condensing epichlorohydrin with 2,2-bis (p-hydroxyphenyl) propane, known generally as bisphenol-A, containing cresyl glycidyl ether as a reactive diluent and having an epoxide equivalent weight of from 175 to 195.

The curing agent used in the first epoxy resin layer of the coating can be any of the well known resin curing agents. Such agents are primary, secondary, and tertiary amines, quaternary ammonium compounds, Friedel-Crafts catalysts, polyamidoamines, and organic polycarboxylic acids and their anhydrides. Illustrative of the amine curing agents are ethylene diamine, diethylene, triamine, diethylamino propylamine, piperadine, methane diamine, benzyl dimethyl amine, diaminodiphenyl sulphone, dicyandiamide and iminobispropylamine. In general, the amine curing agents are employed in the first epoxy resin layer. A particularly useful class of amine curing agents are the amine adduct curing agents prepared from reacting an alkyline oxide such as ethylene or propylene oxide with polyamines. Typical of the polyamine glycidyl polyether adducts are compounds such as N-hydroxyethyl ethylene diamine, N-hydroxyethyl pentamethylene diamine, N-hydroxyethyl diethylene triamine and the like. Especially desirable as a curing agent in the first epoxy resin layer is an ethylene oxide, or a diethylene triamine adduct such as N-hydroxyethyl diethylene triamine.

In general, in the first epoxy resin layer, the curing agent is present in quantities sufficient to cure the epoxy resin to an infusible product and usually in an amount of from 20 to 70 parts by weight to 100 parts by weight of the epoxy resin.

While it is not absolutely necessary, it is generally preferred that the first epoxy resin layer contain a filler. Suitable fillers include silica, titanium dioxide, barytes and the like. The filler, when used, is usually present in an amount of from 50 to 300 parts by weight to 100 parts of the epoxy resin.

The first epoxy resin layer of the coating can be applied to the floor, wall, etc., in any desirable thickness. Generally, however, the thickness of the first layer will be from 10 to 50 mils.

After the first epoxy resin layer of the coating herein has been applied to the substrate surface being coated, an aggregate is broadcast thereover. The aggregate used can be any of a number of materials and of any shape. For example, small flat pieces, chips, flakes or particles of naturally occurring mineral substances such as quartz, marble, sand, granite, or other can be used depending on the desired appearance of the coated surface. The dimensions of the individual pieces of the aggregate are not especially critical. A particularly desirable aggregate consists of small flakes or chips of filled synthetic resins. These filled synthetic resins usually comprise of from 50 to 90 percent by weight of a latex polymer containing filler such as barytes, calcium carbonate, titanium dioxide, color pigments, plasticizers, stabilizers, along with pigments, preservatives and the like. As examples of desirable filled synthetic polymers, three which may be mentioned are the filled latexes of polyvinylacetate, homopolymers and copolymers, polyvinylchloride polymers and copolymers, polyacrylics, styrene-butadiene copolymers and the like. The filled synthetic polymers used herein generally are from 1 to 6 mils and preferably 3 to 5 mils thick, of irregular shape, and have a surface area of from about $\frac{1}{16}$ to about 1 square inch.

The second epoxy resin layer of the coating which is applied over the first layer containing the aggregate, described above, is comprised of a polyglycidyl ether of a polyhydric phenol having an epoxide equivalent weight of greater than 150 and preferably from 170 to 400. In particular, epoxy resins derived from the reaction of epichlorohydrin and bisphenol-A are preferred. As is readily recognized, other epoxy resins may be used in conjunction with the polyglcidyl ethers of the polyhydric phenols in the second epoxy resin layer to form mixed epoxide compositions.

The amine curing agent used in the second epoxy resin layer is one chosen from the group consisting of diamines having the general formula

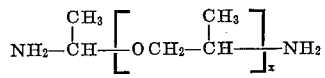

wherein $x$ is from about 2 to 34 and triamines having the general formula

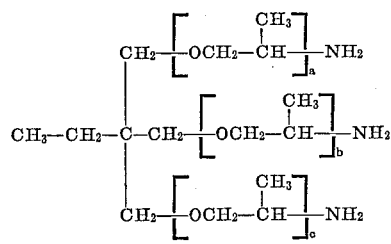

wherein $a+b+c=5.3$.

The diamines and triamines described above are prepared from propylene glycols and triols by suitable amination techniques. Especially preferred are the diamines described above wherein $x$ is from 2 to 6.

The amount of diamine or triamine used in the second epoxy resin layer need only be enough to cure the resin to an infusible product. More particularly however, the diamine or triamine in the second epoxy resin layer will be from about 20 to about 70 parts by weight of the epoxy resin in the second epoxy layer.

As in the case of the first epoxy resin layer, the thickness of the second epoxy resin layer can vary over fairly wide limits but will usually be from 3 to 250 mils thick, or more, but will range preferably from 10 to 50 mils thick.

It is within the spirit and scope of the present invention to include in the compositions disclosed herein any and all materials which are usually included in such compositions such as dyes, pigments, fillers, hardening accelerators, anti-foam agents, leveling agents, and the like.

The first and second epoxy resin layers can be applied by methods well known in the art such as spraying, troweling, rolling, brushing, etc.

While the coatings herein can be cured at temperatures of from 10° to 150° C., it is generally preferred to cure the coatings at a temperature of around 20° to 30° C.

The invention is best illustrated by the following examples which are not to be construed as a limitation on the scope thereof. Amounts are by weight unless otherwise indicated. In all cases, a first epoxy resin layer was applied to a concrete surface. The first epoxy resin layer consisted of 100 parts of a epichlorohydrin-bisphenol-A type epoxy resin containing cresyl glycidyl ether as a reactive diluent and 25 parts of an amine adduct curing agent. The epoxy resin used contained 50 wt. percent of a filler comprised of titanium dioxide, calcium carbonate and wetting agents. The amine adduct curing agent was an ethylene oxide-diethylene triamine adduct. The first epoxy resin layer had a thickness of about 10 mils. An aggregate consisting of chips of filled polyvinylacetate homopolymer of 3–5 mils thickness with a surface area of $\frac{1}{16}$ to 1 square inch was broadcast over the first epoxy resin layer.' This combination was allowed to cure about 4 hours at about 23° C. Following curing of the first epoxy resin layer, the second epoxy resin layer, consisting of the composition of the examples below was applied over the first layer containing the aggregate.

EXAMPLE 1

The second epoxy resin layer of this example contained 100 parts of epichlorohydrin-bisphenol-A epoxy resin having an epoxide equivalent weight of 180 to 195, 35 parts of a polyoxypropylene-diamine defined above having a molecular weight of 230, i.e., wherein $x$ was 2.6, 1 part of a silicone leveling agent marketed as SR–82 by General Electric Company, and 1 part of a silicone defoamer marketed as L–527 by Union Carbide Company. The composition of this example was applied to the cured combination described above in films from 10 to 50 mils thick. Upon curing of the second epoxy resin layer, the overall floor coating had an excellent appearance and after 6 months of use, showed very little wear. The second epoxy resin layer of this example, when cured, possessed the following physical properties:

Flexural strength, A.S.T.M. D–790–66—17,000 p.s.i.
Flexural modulus, A.S.T.M. D–790–66—4.5×$10^5$ p.s.i.
Tensile strength, A.S.T.M. D–638–64T—10,600 p.s.i.
Conical mandrel at −40° F.—Failed
Amine blush—None
Color, Gardner—1–2
Hardness, Shore D—85
Taber abrasion, CS–10 Calibrase Wheel—24
Pencil hardness—F
Izod impact, 23° C.—1.05 ft. lb./in. notch

EXAMPLE 2

The composition and procedure of Example 1 was followed except that 60 parts of a polyoxypropylenediamine having a molecular weight of 400, i.e., $x$ was 5.8, was used. As in Example 1, the coating when cured had excellent appearance and after 6 months of use showed little or no wear. The cured resin of the second epoxy resin layer of this example displayed the following properties:

Flexural strength, A.S.T.M. D-790-66—15,400 p.s.i.
Flexural modulus, A.S.T.M. D638-64T—$4.5 \times 10^5$ p.s.i.
Tensile strength, A.S.T.M. D-638-64T—9,400 p.s.i.
Amine blush—None
Color, Gardner—1-2
Hardness, Shore D—85
Taber abrasion, CS-10 Calibrase Wheel—27
Pencil hardness—F
Izod impact, 23° C.—1.03 ft. lb./in. notch As the above examples clearly demonstrate, the compositions of the present invention can be used to provide coatings of excellent appearance and superior physical properties.

What is claimed is:

1. A substrate having thereon a cured coating comprising a first epoxy resin layer, said first epoxy resin layer being an adhesive barrier coat comprising a polyepoxide resin having an epoxy equivalency of more than one and an amine curing agent, an aggregate material deposited onto said first epoxy resin layer, a second epoxy resin layer, said second epoxy resin layer being a finishing overcoat directly on said first epoxy resin layer and said aggregate material, said overcoat comprising a polyglycidyl ether of a polyhydric phenol having an epoxide equivalent weight of greater than 150 and a liquid polyoxypropyleneamine chosen from the group consisting of diamines having the general formula:

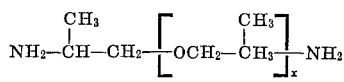

wherein $x$ is from about 2 to 34 and triamines having the general formula:

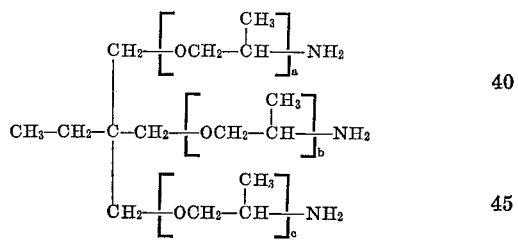

wherein $a+b+c=5.3$, said cured coating being substantially free of amine blush.

2. The coated substrate of claim 1 wherein said polyepoxide in said first epoxy resin layer is a reaction product of epichlorohydrin and bisphenol-A containing cresyl glycidyl ether, and said amine curing agent is an ethylene oxide, diethylene triamine adduct.

3. The coated substrate of claim 2 wherein said amine adduct curing agent is present in an amount of from 20 to 70 parts by weight to 100 parts by weight of said polyepoxide in said first epoxy resin layer.

4. The coated substrate of claim 2 wherein the thickness of said first epoxy resin layer is from 10 to 50 mils.

5. The coated substrate of claim 4 wherein said aggregate consists of irregularly shaped chips of filled synthetic polymers having a thickness of from 3-5 mils and a surface area of from about 1/16 to about 1 square inch.

6. The coated substrate of claim 5 wherein said polyglycidyl ether of said polyhydric phenol in said second epoxy resin layer is a reaction product of epichlorohydrin and bisphenol-A having an epoxide equivalent weight of from 170 to 400.

7. The coated substrate of claim 6 wherein said polyoxypropyleneamine is a diamine having the general formula

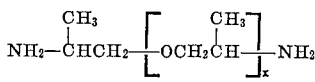

wherein $x$ is from 2 to 6.

8. The coated substrate of claim 7 wherein said polyoxypropyleneamine in said second epoxy resin layer is present in an amount of from about 20 to about 70 parts by weight to 100 parts by weight of said polyglycidyl ether.

9. The coated substrate of claim 8 wherein the thickness of said second epoxy resin layer is from 3 to 250 mils.

10. A method of coating comprising
    (a) applying a first epoxy resin layer to a substrate, said first epoxy resin layer comprising a polyepoxide resin having an epoxy equivalency of more than one an an amine curing agent,
    (b) broadcasting an aggregate onto said first epoxy resin layer,
    (c) curing said first epoxy resin layer containing said aggregate,
    (d) applying a second epoxy resin layer over said first epoxy resin layer containing said aggregate, said second epoxy resin layer comprising a polyglycidyl ether of a polyhydric phenol having an epoxide equivalent weight of greater than 150 and a liquid polyoxypropyleneamine chosen from the group consisting of diamines having the general formula

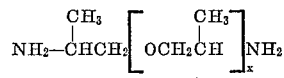

wherein $x$ is from 2 to 34 and triamines having the general formula

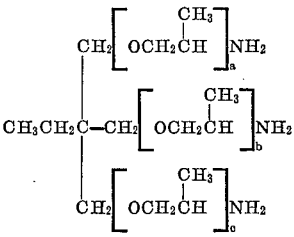

wherein $a+b+c=5.3$,
    (e) curing said second epoxy resin layer.

References Cited

UNITED STATES PATENTS

| | | | |
|---|---|---|---|
| 2,925,831 | 2/1960 | Welty et al. | 117—26 |
| 3,080,253 | 3/1963 | Dietz et al. | 117—26 |
| 3,140,195 | 7/1964 | Nagel | 117—26 |
| 3,220,981 | 11/1965 | MacPeek et al. | |
| 3,306,809 | 2/1967 | Williamson et al. | 260—47 X |
| 3,316,185 | 4/1967 | Reinking | 260—47 X |
| 3,356,634 | 12/1967 | McGinley. | |
| 3,360,391 | 12/1967 | Richtzenhain et al. | 117—26 |
| 3,367,911 | 2/1968 | Daum et al. | |
| 3,380,881 | 4/1968 | Williamson et al. | 260—47 X |

WILLIAM D. MARTIN, Primary Examiner

R. HUSACK, Assistant Examiner

U.S. Cl. X.R.

117—72, 75, 123; 260—47